United States Patent [19]

Weill et al.

[11] Patent Number: 5,244,304

[45] Date of Patent: Sep. 14, 1993

[54] CEMENT BASED PATCHING COMPOSITION FOR ASPHALT PAVEMENT

[75] Inventors: Ed Weill, Baltimore; Geoffrey A. Crenson, White Hall, both of Md.

[73] Assignee: American Stone-Mix, Inc., Towson, Md.

[21] Appl. No.: 668,923

[22] Filed: Mar. 13, 1991

[51] Int. Cl.$^5$ .............................................. E01C 11/08
[52] U.S. Cl. ........................................ 404/67; 404/74; 106/721; 427/204
[58] Field of Search ................. 404/17, 32, 33, 67, 404/69, 72, 75, 74; 427/138, 204; 106/274, 275, 721

[56] References Cited

U.S. PATENT DOCUMENTS

| | | | |
|---|---|---|---|
| 2,773,777 | 12/1956 | Alexander et al. | 106/96 |
| 2,841,060 | 7/1958 | Coppage | 94/23 |
| 3,230,103 | 1/1966 | Minnick et al. | 404/17 |
| 3,253,521 | 5/1966 | Endres et al. | 94/23 |
| 3,891,585 | 6/1975 | McDonald | 260/28.5 |
| 3,930,100 | 12/1975 | McDonald | 428/323 |
| 3,948,830 | 4/1976 | Donnelly et al. | 106/794 X |
| 4,021,393 | 5/1977 | McDonald | 260/28.5 |
| 4,069,182 | 1/1978 | McDonald | 260/28.5 |
| 4,113,401 | 9/1978 | McDonald | 404/75 |
| 4,243,568 | 1/1981 | Brown | 524/475 |
| 4,369,054 | 1/1983 | Shinholster, Jr. et al. | 71/25 |
| 4,404,311 | 9/1983 | Mathis et al. | 524/486 |
| 4,430,463 | 2/1984 | Mullenax | 404/32 |
| 4,547,399 | 10/1985 | Fujihara et al. | 427/138 |
| 4,564,310 | 1/1986 | Thelen et al. | 404/31 |
| 4,714,507 | 12/1987 | Ohgushi | 404/75 |
| 4,801,332 | 1/1989 | Selfridge et al. | 106/273 |
| 4,880,467 | 11/1989 | Rirsch et al. | 524/8 |

Primary Examiner—Ramon S. Britts
Assistant Examiner—Roger J. Schoeppel
Attorney, Agent, or Firm—Delio & Peterson

[57] ABSTRACT

A paving composition comprises a cement binder, a dispersible latex polymer binder, and a mineral aggregate filler such as sand. The filler may be made up of mineral fines such as fly ash, mineral aggregate such as sand, and/or an elastomeric filler such as ground rubber particles. The composition may further include a defoamer, a plasticizer and a dispersible pigment, the latter preferably being a black pigment to color the composition to that of asphalt pavement. Preferably, the composition is in the form of a dry mixture capable of forming a hard patch bonded to an asphalt surface when admixed with water in which the cement binder comprises up to about 15 percent by weight of the mixture, the latex polymer binder comprises up to about 10 percent by weight of the mixture, the elastomeric filler comprises up to about 10 percent by weight of the mixture, the mineral filler comprises up to about 30 percent by weight of the mixture, and the mineral aggregate filler comprises from about 60-98 percent by weight of the mixture. The present invention is directed in particular to use in patching a depression in asphalt pavement by preparing a patching composition as described above, admixing the patching composition with water, filling the depression with the patching composition, and curing the patching composition to form a hardened patch in the pavement. When completed, the hardened, essentially bitumen-free patching composition has a surface conforming substantially to the surface of the surrounding asphalt pavement and is bonded thereto.

27 Claims, 1 Drawing Sheet

CEMENT BASED PATCHING COMPOSITION FOR ASPHALT PAVEMENT

BACKGROUND OF THE INVENTION

This invention relates to a cement based patching composition and, in particular, to a patching composition which incorporates cement, a dispersible latex polymer binder, a mineral aggregate filler and an elastromeric filler, and a method for using same in paving, repairing or filling depressions in asphalt pavement.

Because of degradation due to use and weather, repair of asphalt or bituminous pavement as always been a great concern for those who must maintain highways, roads and parking areas. As used herein, the terms "asphalt" and "bituminous" shall be used interchangeably to refer to pavement surfaces in which bitumen-containing materials are employed as a base for the pavement. Repair of such pavements is also of great concern to the average homeowner or small business owner who cannot easily and inexpensively obtain the material and equipment need for conventional hot or cold asphalt patching. At most, only common hand tools and equipment are available to effect such repairs.

Bitumen emulsions and bitumen emulsions containing mineral fillers are sometimes used to filling depressions in asphalt surfaces. While these materials may be easily applied with hand tools, they are generally not suitable in applications where filling is required to a depth greater than one-half inch. Another product, "Asphalt Repair" manufactured by Set Consumer Products, Inc., comprises black pigmented magnesium phosphate concrete and may be used for repair of asphalt pavement in thicknesses greater than one-half inch. However, this product is generally not useful in applications of lower thickness or for applying a feather edge to a patch, and does not exhibit flexibility conforming substantially to the surrounding asphalt pavement.

Concrete mixes consisting generally in excess of 12-15% portland cement, the balance being sand and/or stone aggregate, are sometimes employed to patch depressions, holes or cracks in asphalt pavement. Such products are generally easily prepared by mixing with water, utilizing conventional hand tools, and do not require any specialized equipment or techniques to apply. However, cementitious materials such as concrete mixes normally do not bond sufficiently to asphalt, nor do they exhibit enough flexibility to conform to the deformation encountered on asphalt pavement surfaces.

Other prior art patching and paving compositions are disclosed in U.S. Pat. No. 2,773,777 to Alexander et al., U.S. Pat. No. 4,021,393 to McDonald and U.S. Pat. No. 2,841,060 to Coppage. The Alexander et al. patent discloses a bituminous composition suitable for use in construction surfaces such as roadway, foot paths, floor, or runways, which comprises a selected mineral aggregate, bitumen, portland cement and a small amount of at least one water soluble polyvalent metal salt of a strong mineral acid. McDonald discloses an elastromeric paving material which incorporates ground rubber into asphalt, while Coppage discloses a so-called "bituminous concrete" paving composition in which a natural or synthetic rubber aqueous dispersion is injected into a heat-liquified bituminous material. However, these latter two compositions are required to be heated prior to application.

Bearing in mind the problems and deficiencies in the prior art and long felt needs, it is therefore an object of the present invention to provide an improved, bitumen-free patching composition which is compatible with asphalt paving.

It is another object of the present invention to provide a paving or patching composition which may be applied using conventional hand tools.

It is a further object of the present invention to provide a paving or patching composition which is available in dry, granular form and may be mixed with water at the work site.

It is yet another object of the present invention to provide a bitumen-free patching composition which is compatible in flexibility and other properties with asphalt paving and which bonds tightly to the asphalt pavement.

It is a further object of the present invention to provide an improved paving and patching composition which meets the aforestated objects, yet which is relatively inexpensive to manufacture and easy to apply to pavement without heating.

It is yet another object of the present invention to provide a long lasting, durable, flexible patching composition which blends in with the surrounding asphalt pavement.

SUMMARY OF THE INVENTION

The above and other objects, which will be apparent to those skilled in the art, are achieved in the present invention which is directed in one aspect to a paving composition comprising a cement binder, a dispersible latex polymer binder, and a filler. The filler may be particles of mineral fines such as fly ash, mineral aggregate filler such as sand, elastomeric filler such as ground rubber, or combinations thereof. The composition may further include a defoamer, a plasticizer and a dispersible pigment, the latter preferably being a black pigment to color the composition to that of asphalt pavement. Preferably, the composition is in the form of a dry mixture capable of forming a hard patch bonded to an asphalt surface when admixed with water in which the cement binder comprises up to about 15 percent by weight of the mixture, the mineral filler comprises up to about 30 percent by weight of the mixture, the latex polymer binder comprises up to about 10 percent by weight of the mixture, the elastomeric filler comprises up to about 10 percent by weight of the mixture, and the mineral aggregate filler comprises from about 60-98 percent by weight of the mixture.

In another aspect, the present invention is directed to a method of patching a depression in asphalt pavement comprising the steps of obtaining or preparing a patching composition as described above, admixing the patching composition with water, filling the depression with the patching composition, and curing the patching composition to form a hardened patch in the pavement. The aforedescribed method may be practiced with standard hand tools at ambient conditions and without the applying heat to the composition. When completed, the essentially bitumen-free hardened patching composition has a surface conforming substantially to the surface of the surrounding asphalt pavement and is bonded thereto.

DETAILED DESCRIPTION OF THE INVENTION

Figure 1:
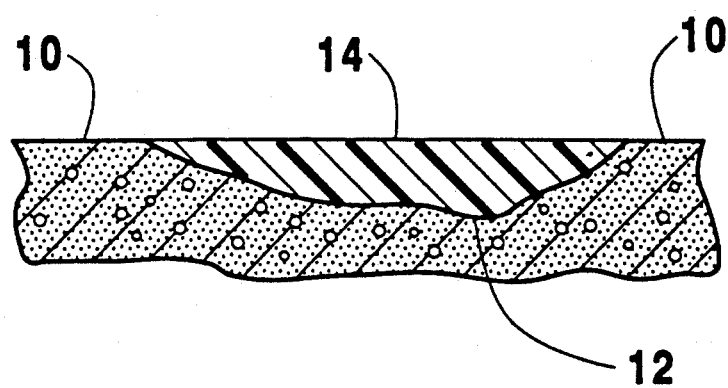
FIG. 1 is a cross-sectional view of an asphalt surface depression filled with the hardened patching composition of the present invention.

The composition of the present invention is a cement based, preferably pigmented mix which exhibits sufficient flexibility and strength and which can bond adequately to repair asphalt pavement surfaces. The composition of the present invention is most preferably used as patching composition for repairing depressions in asphalt or similar pavement surfaces, including holes, cracks, voids, and other damaged or deteriorated areas. The composition of the invention may also be used as a general paving composition to replace existing sections of asphalt pavement or to create new pavement surfaces compatible with asphalt pavement.

The preferred embodiment of the present invention incorporates the components of the paving composition in dry, granular, free-flowing, preblended form for admixture with water at the work site. Such admixture may be done prior to applying the composition to the surface, for example, in a wheel barrel or by using conventional hand tools such as a shovel or hoe. Alternatively, if such premixing is not convenient, water may be incorporated into the preblended components on the work surface itself either by pouring a sufficient amount of water to the depression and then adding the preblended components, or vise versa.

The cement portion normally comprises only a minor amount of the total dry mixture of the components, and is preferably on the order of less than 15-20% by weight of the total dry mixture. Unless otherwise stated, all percentages disclosed herein are by weight. The cement is more preferably employed in the range of 1-10%, and most preferably in the range of 2-6%, of the mixture. The term "cement" refers generally to cementitious compositions incorporating lime, alumina, silica and other components, such as portland cement and the like, although other specialty cements may also be utilized. Portland cement is the preferred cement utilized. Although the cement acts as a binder for compressive strength, the total amount of cement employed should generally be kept to a low enough level to limit ultimate strength and brittleness so that the properties of the hardened patch are compatible with those of the surrounding asphalt pavement. This aspect is relatively important since asphalt pavement has lower strength and higher flexibility than cured concrete.

In conjunction with and to supplement the cement portion, one or more fillers having essentially no binding ability of their own are provided in the dry mixture. Such fillers may be natural (e.g. mineral) or synthetic (e.g. synthetic polymer) particles, and sized as either fines, larger aggregate or a mixture of each. As used herein, the terms "aggregate" and "fines" refer generally to particles having sizes above and below 100 mesh (U.S. Standard), respectively. Examples of mineral aggregate filler are sand or stone. The sand may be any grade of sand generally utilized with cementitious products, such as oolitic aragonite sand having a $CaCO_3$ content of at least 95%, and is preferably 99% −20 mesh (U.S. Standard), and less than 1% −200 mesh (approximately American Foundry Sand No. 51). Fillers made up of elastomeric particles are also useful and are discussed further below. The total amount of filler such as sand or other mineral aggregate filler may be in the range of about 60-98% of the mixture, preferably in the range of about 75-90% of the mixture.

Other mineral fillers which supplement the cement to provide mineral fines may be incorporated into the dry mixture in addition to the mineral aggregate and other fillers described above to provide texture and consistency. A preferred fine mineral filler is fly ash, a lime-reactive, water insoluble filler made from burning anthracite or bituminous coal. Where fly ash is employed, it is usually of smaller particle size, approximately 99% −100 mesh. It is important that the fly ash or other mineral fines have a particle size distribution which approximates and simulates the particle size distribution of the cement, and forms a paste upon mixing with water which fills the voids in the aggregate matrix. The fly ash or other fine mineral fillers may be employed in the range of up to about 30% of the mixture.

To permit the components of the mixture to form flexible bonds between the cement particles as well as between the cement particles and the other aggregates, there is provided in the mixture a dispersible latex polymer binder. This latex binder is preferably in a dry granular form so as not to introduce water or other aqueous solution into the mix prior to admixture at the work site. The latex polymer binder may be a natural or synthetic latex, or a combination of more than one latex. Preferably, the latex polymer binder is an ethylene-vinyl acetate copolymer (20/80 monomer ratio). Generally, the latex polymer binder may be provided in an amount up to approximately 15% of the mixture and is preferably in the range of 1-10%, more preferably 2-5%, of the mixture. The dry latex binder is generally incorporated in an amount of 0.5 to 1.0 times the amount of cement present in the mixture. Optionally, a defoamer to reduce air entrapment by the latex following admixture with water (and therefore increase its toughness and structural strength) may be incorporated in an amount up to about 5%, and preferably no more than approximately than 3%, of the mixture.

While the use of the dispersible latex polymer binder provides adequate flexibility and adhesion to the patching composition, and, in particular, its ability to bond to the asphalt pavement, additional flexibility may be obtained by incorporating an elastomeric filler such as natural or synthetic rubber or other elastomeric particles. Preferably ground up rubber such as that obtained by recycling motor vehicle tires may be utilized. The preferred particle size of the elastomeric filler is less than about 80 microns. Such elastomeric fillers may be employed generally in range of up to about 15%, preferably no greater than about 5-10%, of the mixture.

Other optional components include superplasticizers and/or water reducers to increase fluidity of the composition and to lower the water requirements, such as melamine sulfonate condensate. Such superplasticizers and water reducers may be incorporated in amounts up to about 3% of the mixture. Also, to ensure that the patch aesthetically conforms to the asphalt surface, a dispersible pigment such as a black pigment comprising lampblack may be incorporated in an amount up to about 5% of the mixture.

In use, the composition of the present invention requires no addition of bitumen based ingredients, and may be mixed with water and applied to the work surface at prevailing ambient outdoor temperatures in the range of 50°-100° F. The preferred amount of water is about 150 ml/kg dry mix, although other amounts of water may be used to give different consistencies. As with other cementitious compositions employing water, it is preferable that the composition not be applied in sub-freezing temperatures unless steps are taken to ensure that the water does not freeze prior to full reaction with the components of the composition. Like concrete mix, the present invention is amenable to manufacture as a stable, dry, free-flowing baggable mix for consumer use.

Depressions in asphalt pavement may be repaired by removing foreign material from the depression, obtaining the preblended patching composition as described above, admixing the composition with water either before or while filling the depression, and then permitting the composition to cure to form a hardened patch. Prior to the initial set of the composition, the surface should be troweled smooth or shaped to conform substantially to the surrounding pavement. A particular advantage of the present invention is that it is useful not only in relatively deep depressions in which the patch thickness is greater than 2 inches, but also in relatively shallow depressions of less than ½ inch thickness. As such, the edges of the patch may be feathered to minimal thickness while still retaining sufficient strength and flexibility, and bonding to the asphalt pavement. The composition of the present invention when utilized as a patch develops physical characteristics which are comparable to the surrounding asphalt pavement so that it resists cracking or crumbling because of differences in strength or flexibility. Final set occurs in approximately six to eight hours, with curing occurring in about 24 hours. In FIG. 1 there is shown a pavement surface 10 having a portion 12 forming a shallow depression. A hardened patch 14 formed by the composition of the present invention fills in depression portion 12 so as to bond to the asphalt pavement and have a surface conforming substantially to the surface of the surrounding asphalt pavement. Additionally, the thermal expansion properties of the composition are sufficiently close to asphalt to minimize cracking, which also reduces the tendency for separation cracks to develop which could result in collection of water and breakup due to the freeze/thaw cycle in northern climates. The composition is likewise useful in replacing sections of asphalt pavement or in new pavements, if so desired.

Non-limiting examples of preferred embodiments of the present invention are set forth below in Tables I and II.

TABLE I

| Components | Wt. % of Total |
| --- | --- |
| Ideal Basic Regulated Set Cement | 3.50 |
| Oolitic Aragonite Sand | 86.86 |
| Flyash | 4.50 |
| Airflex RP-245 Redispersible Latex Powder | 2.58 |
| Rhone-Poulenc 775DD Defoamer | 0.85 |
| Rouse GF-80 Micro-ground Rubber | 0.50 |
| Memlet F-10 Superplasticizer/Dispersant | 0.15 |
| Mineral Pigments #8452 Black | 1.01 |

TABLE II

| Components | Wt. %-of Total |
| --- | --- |
| Ideal Basic Regulated Set Cement | 4.25 |
| Oolitic Aragonite Sand | 86.86 |
| Flyash | 3.80 |
| Airflex RP-245 Redispersible Latex Powder | 2.58 |
| Rhone-Poulenc 775DD Defoamer | 0.85 |
| Rouse GF-80 Micro-ground Rubber | 0.50 |
| Memlet F-10 Superplasticizer/Dispersant | 0.15 |
| Mineral Pigments #8452 Black | 1.01 |

Dry mixes of the formulations shown in Tables 1 and 2 have been mixed with water in the ratio of approximately 150 ml water/kg dry mix and troweled into forms to thicknesses of ¼ and ⅜ inch. At various stages of curing, usually 18 to 24 hours after mixing an application, specimens are subjected to a general water stream impinging on the center from above for a period of approximately 20 minutes. Specimens made from the formulations of Tables 1 and 2 have not shown any observed erosion. Additionally, such samples have shown resistance to abrasion, depression and slicing, and furthermore, have shown acceptable flexure upon bending.

While this invention has been described with reference to specific embodiments, it will be recognized by those skilled in the art that variations are possible without departing from the spirit and scope of the invention, and that it is intended to cover all changes and modifications of the invention disclosed herein for the purposes of illustration which do not constitute departure from the spirit and scope of the invention.

Having thus described the invention, what is claimed is:

1. A dry composition for repairing asphalt pavement comprising a mixture of:
   a cement binder in an amount less than 20% by weight of said composition;
   a water dispersible powdered latex polymer binder in an amount at least 0.5 times the weight of cement binder; and
   a filler, said composition being a dry, chemically stable, freeflowing powder adapted for mixing with water at the work site and capable of bonding to said asphalt pavement and of developing durability characteristics comparable to said asphalt pavement upon curing.

2. The composition of claim 1 wherein said filler is selected from the group consisting of particles of mineral fines, mineral aggregate and elastomeric fillers, and combinations thereof.

3. The composition of claim 1 wherein the amount of said cement binder is no greater than about 15 percent by weight of said composition.

4. The composition of claim 1 wherein the amount of said latex polymer binder is no greater than about 10 percent by weight of said composition.

5. The composition of claim 1 wherein the amount of said filler is from about 60–98 percent by weight of said composition.

6. The composition of claim 2 including an elastomeric filler in an amount no greater than about 10 percent by weight of said composition.

7. The composition of claim 2 wherein said composition further includes a defoamer, a plasticizer and a dispersible pigment.

8. The composition of claim 2 wherein said cement binder comprises no greater than about 10 percent by weight of said composition and said latex polymer binder comprises no greater than about 10 percent by weight of said composition, and including mineral fines comprising no greater than about 30 percent by weight of said composition, mineral aggregate comprising from about 75–90 percent by weight of said composition, and an elastomeric filler comprising no greater than about 10 percent by weight of said composition.

9. The composition of claim 1 wherein said filler is selected from the group consisting of fly ash, sand, and rubber particles, and combinations thereof.

10. A dry mixture capable of forming a hard patch bonded to an asphalt surface when admixed with water comprising:
- a cement binder in an amount no greater than about 20 percent by weight of said mixture;
- a water dispersible, powdered latex polymer binder in an amount no greater than about 15 percent by weight of said mixture;
- a plasticizer in an amount no greater than about 5 percent by weight of said mixture;
- a dispersible pigment in an amount no greater than about 5 percent by weight of said mixture;
- an elastomeric filler in an amount no greater than about 15 percent by weight of said mixture; and
- a mineral aggregate filler in an amount of about 60-98 percent by weight of said mixture,
- said mixture being a dry, chemically stable, free-flowing powder adapted for mixing with water at the work site and capable of bonding to said asphalt surface and developing durability characteristics comparable to said asphalt surface upon curing.

11. The composition of claim 10 wherein said composition further includes mineral fines in an amount no greater than about 30 percent by weight of said mixture.

12. The composition of claim 10 wherein said composition further includes a defoamer in an amount no greater than about 5 percent by weight of said mixture.

13. The composition of claim 10 wherein said cement includes portland cement in an amount no greater than 10 percent by weight of said mixture, and said mineral aggregate filler includes sand in an amount of about 75-90 percent by weight of said mixture.

14. A method of patching a depression in asphalt pavement comprising the steps of:
a) preparing a patching composition comprising a cement binder in an amount less than 20% by weight of said composition; a dispersible latex polymer binder; a filler; a defoamer in an amount no greater than about 5 percent by weight of said composition; a plasticizer in an amount no greater than about 5 percent by weight of said composition; and a dispersible pigment in an amount no greater than about 5 percent by weight of said composition;
b) admixing said patching composition with water;
c) filling said depression with said patching composition; and
d) curing said patching composition to form a hardened patch on said pavement.

15. The method of claim 14 wherein said patching composition comprises latex polymer binder in an amount no greater than about 10 percent by weight of said composition, mineral fines in an amount no greater than about 30 percent by weight of said composition, mineral aggregate in an amount from about 70-90 percent by weight of said composition, and elastomeric filler in an amount no greater than about 10 percent by weight of said composition.

16. The method of claim 14 wherein said composition includes portland cement in an amount no greater than about 10 percent by weight of said mixture and sand in an amount of about 75-90 percent by weight of said mixture.

17. The method of claim 14 wherein said filler is selected from the group consisting of fly ash, sand, and rubber particles, and combinations thereof.

18. A pavement surface comprising an asphalt pavement surface having a shallow depression in a portion thereof, said depression being filled with a hardened patching composition made by reacting a mixture of a cement binder in an amount less than 20% by weight of said mixture, a dispersible latex polymer binder, a filler, a defoamer in an amount no greater than about 5 percent by weight of said mixture, a plasticizer in an amount no greater than about 5 percent by weight of said mixture, and a dispersible pigment in an amount no greater than about 5 percent by weight of said mixture with water, said patching composition having a surface conforming substantially to the surface of the surrounding asphalt pavement and being bonded thereto.

19. The pavement surface of claim 18 wherein said filler is selected from the group consisting of fly ash, sand, and rubber particles, and combinations thereof.

20. The pavement surface of claim 18 wherein said patching composition is essentially bitumen-free.

21. The pavement surface of claim 18 wherein said filler is selected from the group consisting of particles of mineral fines, mineral aggregate and elastomeric fillers, and combinations thereof.

22. The pavement surface of claim 18 wherein the amount of said cement binder is no greater than about 15 percent by weight of said composition.

23. The pavement surface of claim 18 wherein the amount of said latex polymer binder is no greater than about 10 percent by weight of said composition.

24. The pavement surface of claim 18 wherein the amount of said filler is from about 60-98 percent by weight of said composition.

25. The pavement surface of claim 18 including an elastomeric filler in an amount no greater than about 10 percent by weight of said composition.

26. The pavement surface of claim 18 wherein said cement binder comprises no greater than about 10 percent by weight of said composition and said latex polymer binder comprises no greater than about 10 percent by weight of said composition, and including mineral fines comprising no greater than about 30 percent by weight of said composition, mineral aggregate comprising from about 75-90 percent by weight of said composition, and an elastomeric filler comprising no greater than about 10 percent by weight of said composition.

27. The pavement surface of claim 18 wherein said filler is selected from the group consisting of fly ash, sand, and rubber particles, and combinations thereof.

* * * * *